United States Patent
Rendheer

(10) Patent No.: US 11,935,067 B2
(45) Date of Patent: Mar. 19, 2024

(54) SYSTEMS AND METHODS FOR DYNAMICALLY FUNDING TRANSACTIONS

(71) Applicant: Capital One Services, LLC, McLean, VA (US)

(72) Inventor: Joshy Rendheer, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/539,010

(22) Filed: Nov. 30, 2021

(65) Prior Publication Data

US 2023/0169512 A1   Jun. 1, 2023

(51) Int. Cl.
*G06Q 20/40* (2012.01)
*G06N 5/02* (2023.01)
(Continued)

(52) U.S. Cl.
CPC ............ *G06Q 20/405* (2013.01); *G06N 5/02* (2013.01); *G06Q 20/229* (2020.05); *G06Q 20/42* (2013.01)

(58) Field of Classification Search
CPC .... G06Q 20/405; G06Q 20/229; G06Q 20/42; G06N 5/02
See application file for complete search history.

(56) References Cited

U.S. PATENT DOCUMENTS 5,914,472 A * 6/1999 Foladare ............... G07F 7/08
235/382.5
6,327,348 B1 * 12/2001 Walker ................ G06Q 20/385
379/93.12
(Continued)

FOREIGN PATENT DOCUMENTS

AU   2012335640 A1 * 5/2014 ......... G06Q 20/4016
CA   2790529 A1 * 6/2013 ............. G06Q 10/00
(Continued)

OTHER PUBLICATIONS

Country Store Ledgers Provide an Intimate Look at Lives From the Past (Year: 2018).*

(Continued)

*Primary Examiner* — Scott C Anderson
*Assistant Examiner* — James H Miller
(74) *Attorney, Agent, or Firm* — TROUTMAN PEPPER HAMILTON SANDERS LLP; Christopher J. Forstner; John A. Morrissett

(57) ABSTRACT

A system including: one or more processors; a memory storing instructions that, when executed by the one or more processors are configured to cause the system to receive primary and secondary user account data. The system generates one or more predictive model systems based on the primary and secondary user account data. The system receives a first input from the primary user corresponding to a first spending limitation for the secondary user. The system identifies a first transaction of the secondary user exceeding the spending limitation and determines using the one or more predictive model systems whether to authorize a spending limitation override. The system automatically authorizes the spending limitation override when the first transaction exceeds the spending limitation by less than a predetermined threshold. The system can also identify and automatically fund recurring transactions with an associated funding account using the one or more predictive model systems.

15 Claims, 4 Drawing Sheets

(51) Int. Cl.
*G06Q 20/22* (2012.01)
*G06Q 20/42* (2012.01)

(56) References Cited

U.S. PATENT DOCUMENTS

| | | | | |
|---|---|---|---|---|
| 7,966,255 | B2* | 6/2011 | Wong | G06Q 20/4037 |
| | | | | 705/41 |
| 8,308,059 | B2 | 11/2012 | Granucci et al. | |
| 8,584,936 | B2 | 11/2013 | Fiebiger et al. | |
| 10,757,267 | B2 | 8/2020 | Neal | |
| 10,937,090 | B1 | 3/2021 | Debie et al. | |
| 11,132,693 | B1* | 9/2021 | Sahni | G06Q 20/10 |
| 2003/0004868 | A1* | 1/2003 | Early | G06Q 40/04 |
| | | | | 705/39 |
| 2005/0137971 | A1* | 6/2005 | Malcolm | G06Q 20/40 |
| | | | | 705/30 |
| 2008/0033880 | A1* | 2/2008 | Fiebiger | G06Q 20/20 |
| | | | | 235/382 |
| 2008/0228637 | A1* | 9/2008 | Scipioni | G06Q 40/02 |
| | | | | 705/35 |
| 2012/0066127 | A1* | 3/2012 | Kingston | G06Q 20/227 |
| | | | | 705/44 |
| 2013/0024364 | A1* | 1/2013 | Shrivastava | G06Q 20/405 |
| | | | | 705/39 |
| 2013/0060691 | A1* | 3/2013 | Typrin | G06Q 40/02 |
| | | | | 705/44 |
| 2013/0226805 | A1* | 8/2013 | Griffin | G06Q 40/02 |
| | | | | 705/44 |
| 2014/0114856 | A1* | 4/2014 | Jung | G06Q 20/3278 |
| | | | | 705/44 |
| 2014/0172686 | A1* | 6/2014 | Haggerty | G06Q 40/08 |
| | | | | 705/38 |
| 2014/0244503 | A1* | 8/2014 | Sadlier | G06Q 20/405 |
| | | | | 705/44 |
| 2014/0250018 | A1* | 9/2014 | Phillips | G06Q 20/405 |
| | | | | 705/72 |
| 2014/0279534 | A1* | 9/2014 | Miles | G06Q 20/4016 |
| | | | | 705/44 |
| 2015/0178725 | A1* | 6/2015 | Poetsch | G06Q 20/3572 |
| | | | | 705/44 |
| 2015/0294293 | A1 | 10/2015 | Signarsson | |
| 2015/0379514 | A1* | 12/2015 | Poole | G06Q 20/325 |
| | | | | 705/44 |
| 2018/0150843 | A1* | 5/2018 | Adjaoute | G06N 20/00 |
| 2018/0189888 | A1* | 7/2018 | Deperro | G06Q 40/06 |
| 2018/0225666 | A1* | 8/2018 | Khan | G06Q 20/405 |
| 2018/0268394 | A1* | 9/2018 | White | G06Q 20/28 |
| 2018/0276670 | A1* | 9/2018 | Ali | G06Q 20/357 |
| 2019/0147430 | A1* | 5/2019 | Chen | G06F 18/2155 |
| | | | | 705/40 |
| 2019/0287182 | A1* | 9/2019 | Chetal | G06Q 10/06398 |
| 2019/0385166 | A1* | 12/2019 | Daetz | G06F 16/951 |
| 2020/0074449 | A1* | 3/2020 | Novis | G06Q 20/227 |
| 2020/0090261 | A1* | 3/2020 | Tumulty | G06Q 20/42 |
| 2020/0349590 | A1* | 11/2020 | Benjamin | G06Q 30/02 |
| 2021/0192600 | A1 | 6/2021 | Carpenter et al. | |
| 2021/0240849 | A1 | 8/2021 | Barday et al. | |
| 2023/0005055 | A1* | 1/2023 | Chen | G06N 20/00 |
| 2023/0042458 | A1* | 2/2023 | Makhija | G06F 9/451 |
| 2023/0043286 | A1* | 2/2023 | Kumar | G06Q 20/4016 |
| 2023/0047509 | A1* | 2/2023 | Dhodapkar | G06Q 20/405 |

FOREIGN PATENT DOCUMENTS

| | | | | |
|---|---|---|---|---|
| WO | WO-2006085885 A1 * | 8/2006 | | G06Q 20/04 |
| WO | WO-2015027216 A1 * | 2/2015 | | G06F 21/6218 |

OTHER PUBLICATIONS

System and Method for Credit Constraints (Year: 2004).*
Method for Debiting Specific Bank Account Based on Merchant Attributes (Year: 2013).*

* cited by examiner

SYSTEMS AND METHODS FOR DYNAMICALLY FUNDING TRANSACTIONS

FIELD

The disclosed technology generally relates to managing the funding of transactions, and more particularly systems and methods for setting dynamic spending limits for secondary account users and/or identifying and automatically funding recurring purchases associated with an account.

BACKGROUND

Currently, there exist a number of credit transaction cards networks that issue transaction cards to their customers. These credit transaction card networks also allow their customers to add one or more "secondary" authorized users to their credit account. These secondary users are issued a credit card that is tied to the account of the primary account holder. Some credit transaction card networks allow the primary account holder to set limits associated with the secondary user, so that the secondary user is limited to purchase below a predetermined spending limit. Some credit transaction card network may also allow the primary account holder to limit purchases by the secondary user to a predetermined list of merchants or merchant locations.

However, current credit transaction card networks do not allow a primary user to set dynamic spending limits. Thus, a secondary user may be denied a purchase if the spending limit is surpassed by even a nominal amount, for example a transaction for $151.00 may be denied if the spending limit set by the primary user is for $150.00. Another issue with current transaction card network systems is that there is no provision to automatically identify a recurring transaction and fund the recurring transaction with an associated account, such as a banking checking or savings account.

Accordingly, there is a need for system and methods for detecting and automatically funding recurring purchases. There is also a need for systems and methods for setting spending limits for secondary account users that may be dynamically adjusted based on the context of the transaction.

The disclosed embodiments are directed to these and other considerations.

BRIEF SUMMARY

Certain disclosed embodiments provide systems and methods for setting spending limits for secondary credit account users. The system may include one or more processors and a memory storing instructions that when executed by the one or more processors are configured to cause the system to perform the steps of a method. The method can include receiving primary user account data associated with a credit account held by a primary user. The method can include receiving secondary user account data associated with a secondary user associated with the credit account. The method may include generating one or more predictive model systems based on the primary user account data and the secondary user account data. The method may include receiving a first user input from the primary user via a graphical user interface. The first user input may correspond to a first spending limitation (e.g., $500) that is associated with the secondary user. The method may include identifying a first transaction associated with the secondary user that exceeds the first spending limitation (e.g., a $526 transaction). The method may include determining, using the one or more predictive model systems, whether to authorize a spending limitation override. The method may include automatically authorizing the spending limitation override when the first transaction exceeds the spending limitation by less than a predetermined threshold (e.g., by less than a threshold of $50). When the first transaction exceeds the spending limitation by the predetermined threshold or greater than the predetermined threshold (e.g., by more than a threshold of $50), the method may include automatically rejecting the spending limitation override and generating, via the graphical user interface, a notification associated with the rejected spending limitation override. The notification may provide an option for the primary user to manually approve the spending limitation override.

In another aspect, a system for detecting and automatically funding recurring purchases is disclosed. The system may include one or more processors and a memory storing instructions that when executed by the one or more processors is configured to cause the system to perform the steps of a method. The method may include receiving account information that is associated with an account held by a user. The method may include generating, for display on a user device, a graphical user interface that includes a listing of first transactions associated with a first billing cycle. The method may include tracking, using the one or more processors, one or more second transactions that are associated with the account over a predetermined time period. The method may includer identifying a first recurring transaction by matching at least one first transaction with at least one second transaction associated with a second billing cycle. The method may include automatically funding the first recurring transaction with a funding account associated with the account. The method may include rearranging the graphical user interface to group the at least one first transaction and the at least one second transaction together as the first recurring transaction.

In another aspect, a system for setting spending limits for secondary credit account users is disclosed. The system may include one or more processors, and a memory in communication with the one or more processors and storing instructions that, when executed by the one or more processors, are configured to cause the system to perform steps of a method. The method may include receiving primary user account data associated with a credit account held by a primary user. The method may include receiving secondary user account data associated with a secondary user associated with the credit account. The method may include generating a primary user predictive model based on the primary user account data. The primary user predictive model may be based on one or more predictive variables selected from primary merchant locations with which the primary user transacts, account spending associated with the primary user, a repayment schedule associated with the credit account, or combinations thereof. The system may generate a secondary user predictive model based on the secondary user account data. The secondary user predictive model may be based on one or more predictive variables selected from secondary merchant locations with which the secondary user transacts, account spending associated with the secondary user, spending limitations associated with the secondary user, or combinations thereof. The method may receive a first user input from the primary user via a graphical user interface. The first user input may correspond to a first spending limitation (e.g., $500) associated with the secondary user. The method may include identifying a first transaction (e.g., $526) associated with the secondary user that exceeds the first spending limitation. The system may include determining, using the primary user predictive model and the secondary user predictive model, whether to authorize a spending limitation override. The method may include automatically authorizing the spending limitation override when the first transaction exceeds the spending limitation by less than a predetermined threshold (e.g., by less than a threshold of $50). When the first transaction exceeds the spending limitation by the predetermined threshold or greater than the predetermined threshold (e.g., by more than a threshold of $50), the method may include automatically rejecting the spending limitation override and generating, via the graphical user interface, a notification associated with the rejected spending limitation override. The notification may provide an option for the primary user to manually approve the spending limitation override.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
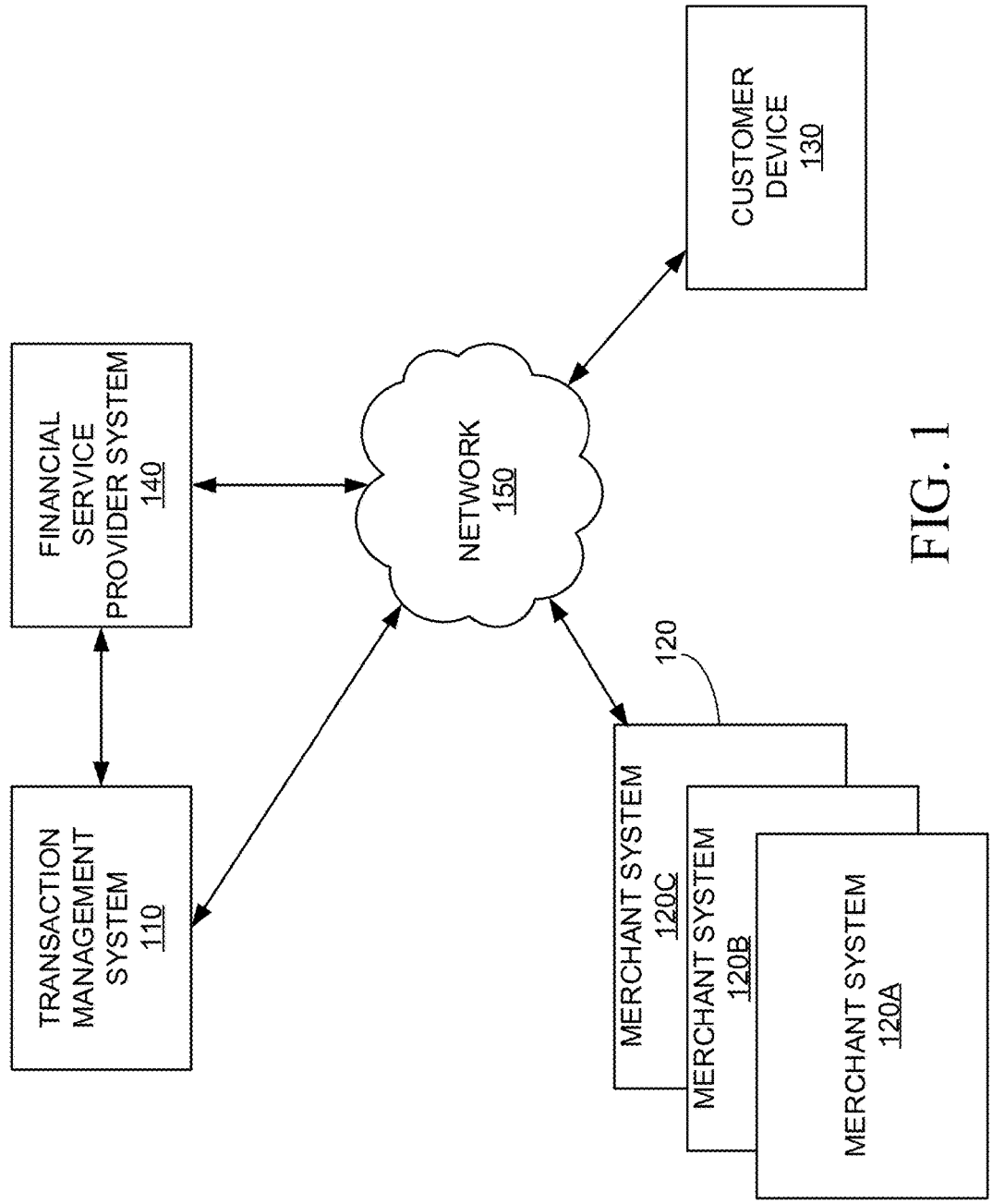
FIG. 1 is a diagram of an example system environment that may be used to implement one or more embodiments of the present disclosure.

Examples of the present disclosure generally include systems and methods for setting spending limits for secondary credit account users as well as detecting and automatically funding recurring purchases. The systems and methods may be configured to build one or more predictive model systems based on primary user account data and secondary user account data. The system may receive a first input from the primary user that sets a spending limitation associated with the secondary user. The system may identify a transaction of the secondary user that exceeds the spending limitation set by the primary user. Using the one or more predictive model systems, the system may automatically authorize the spending limitation override when the first transaction exceeds the spending limitation by less than a predetermined threshold. In another aspect, the system may identify and automatically fund a recurring purchase associated with the account.

The systems and methods described herein are necessarily rooted in computer technology as they relate to improving the functioning of traditional payment systems. Traditional payment systems required manual intervention from primary account holders of an account to authorize transactions which exceed spending limits set for secondary account holders of the account. Additionally, traditional payment systems cannot detect and automatically fund a recurring transaction with a funding account. In some instances, the system utilizes machine learning models to aggregate the data, reduce and filter the data, and generate spending limitation overrides based on the data. Machine learning models are a unique computer technology that involves training the models to complete tasks, such as labeling, categorizing, and identifying recurring transactions. Importantly, examples of the present disclosure improve the speed with which computers can determine recurring transactions and spending limitations and allows spending limitation overrides to be conducted in near real-time, unlike current methods which only use lagging indicators and/or require manual input from a primary account holder.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same references numbers will be used throughout the drawings to refer to the same or like parts.

In accordance with certain disclosed embodiments, system environment 100 may include a transaction management system 110 in communication with a financial service provider system 140, merchant system(s) 120 (e.g., merchant system 120A, merchant system 120B, merchant system 120C, etc.), and customer device over a network 150. Transaction management system 110 may be a computing device, such as a mobile computing device (e.g., a smart phone, tablet computer, smart wearable device, portable laptop computer, voice command device, wearable augmented reality device, or other mobile computing device or fixed computing device (e.g., a desktop computer or server). An example architecture that may be used to implement one or more aspects of system 100 is described below with reference to FIG. 2.

Transaction management system 110 may receive primary user account data that is associated with a credit account held by a primary user and secondary user account data associated with a secondary user associated with the same credit account. Transaction management system 110 may receive the primary user account data and the secondary user account data from a financial service provider, for example financial service provider system 140. The transaction management system 110 may use the data received from financial service provider system 140 to implement one or more predictive model systems. Transaction management system 110 may also be in communication with a merchant system 120. Transaction management system may continuously or intermittently receive transaction information associated with transactions managed by transaction management system 110. In some embodiments, the transaction management system 110 may receive transaction information associated with the transactions from financial service provider system 140.

Merchant system(s) 120 (e.g., merchant system 120A, 120B, 120C, etc.) may each be associated with a respective merchant. Merchant system(s) 120 can each include a merchant point of sale terminal which can process transactions associated with a credit account, for example, a credit account provided by financial service provider system 140. According to some embodiments, merchant system(s) 120 may be configured to transmit transaction data to transaction management system 110 in response to receiving a credit payment associated with a credit account. In other embodiments, the merchant system(s) 120 may transmit the transaction data directly to financial service provider system 140, which may then transmit the transaction information to transaction management system 110.

Customer device 130 may be associated with a user, for example a primary user of a credit account. Customer device 130 may be configured with an application programming interface (API) that allows the customer device 130 to interact with transaction management system 110. For example, customer device 130 can be configured to display a graphical user interface associated with transaction management system 110, that facilitates a primary user to set spending limits for a secondary user (e.g., an authorized user) associated with the account. In some embodiments, the graphical user interface can be configured to display notifications regarding spending limits set by the primary account holder. The customer device 130 can also be configured to receive a user input, for example, via the graphical user interface, that allows the user of customer device 130 to set spending limits for the secondary user. The graphical user interface of the customer device 130 can also provide notifications to the primary account holder when a spending limitation has been exceeded and a transaction has been denied. In some embodiments, the graphical user interface of customer device 130 can provide a notification to the primary account holder that a spending limitation override has been rejected. The notification can provide the primary account holder the option of manually approving a spending limitation override. In some embodiments the graphical user interface of customer device 130 can also display transactions associated with the credit account of the primary account holder. In some embodiments, the transaction management system 110 may identify a recurring transaction which may cause the graphical user interface provided on customer device 130 to automatically rearrange the graphical user interface to group the recurring transactions together.

Network 150 may be of any suitable type, including individual connections via the internet such as cellular or Wi-Fi networks. In some embodiments, network 150 may connect terminals using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. One of ordinary skill will recognize that various changes and modifications may be made to system environment 100 while remaining within the scope of the present disclosure. Moreover, while the various components have been discussed as distinct elements, this is merely an example, and, in some cases, various elements may be combined into one or more physical or logical systems.

Figure 2:
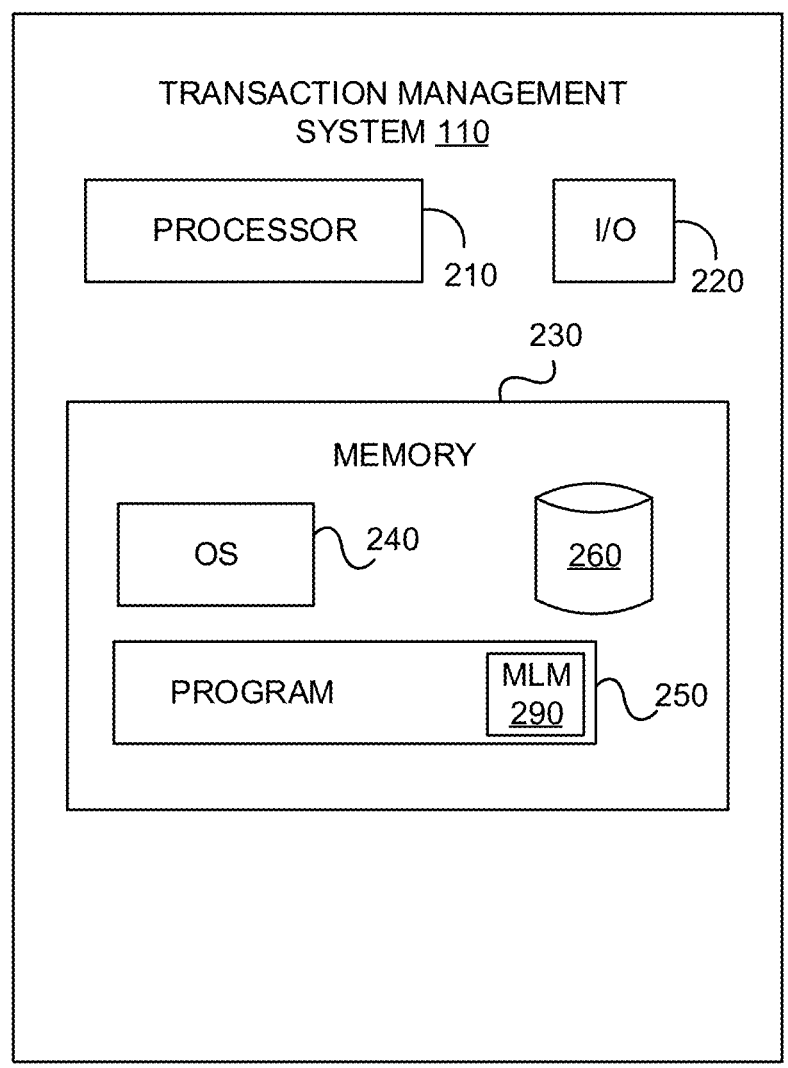
FIG. 2 is a block diagram of a transaction management system, according to an example embodiment.

FIG. 2 is a block diagram (with additional details) of the transaction management system 110, as also depicted in FIG. 1. According to some embodiments, system-terminal financial service provider system 140, user access control repository 120, and/or user profile repository 130, as depicted in FIG. 1, may have a similar structure and components that are similar to those described with respect to transaction management system shown in FIG. 2. As shown, the transaction management system 110 may include a processor 210, an input/output ("I/O") device 220, a memory 230 containing an operating system ("OS") 240 and a program 250. In certain example implementations, the transaction management system 110 may be a single server or may be configured as a distributed computer system including multiple servers or computers that interoperate to perform one or more of the processes and functionalities associated with the disclosed embodiments. In some embodiments, the transaction management system 110 may further include a peripheral interface, a transceiver, a mobile network interface in communication with the processor 210, a bus configured to facilitate communication between the various components of the transaction management system 110, and a power source configured to power one or more components of the transaction management system 110.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the transaction management system 110 may include one or more storage devices configured to store information used by the processor 210 (or other components) to perform certain functions related to the disclosed embodiments. In one example, the transaction management system 110 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the transaction management system 110 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the transaction management system 110 may include the memory 230 that may include one or more programs 250 to perform one or more functions of the disclosed embodiments. For example, in some embodiments, the transaction management system 110 may utilize one or more predictive model systems to determine whether to authorize a transaction that exceeds a spending limitation set by the primary account holder for the secondary account holder. The one or more predictive model systems may be based on the primary user account data and the secondary user account data received by the system. According to some embodiments, program 250 may include a machine learning model 290 that may be used to implement the one or more predictive model systems. According to some embodiments, machine learning model 290 may be configured to facilitate the transaction management system 110 to determine whether to authorize a spending limitation override and/or determine a recurring purchase based on transaction history.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the transaction management system 110 to perform one or more of the processes and functionalities associated with the disclosed embodiments. Database 260 may include stored data related to primary user account data and secondary user account data that is received from financial service provider system 140.

The transaction management system 110 may also be communicatively connected to one or more memory devices (e.g., databases) locally or through a network. The remote memory devices may be configured to store information and may be accessed and/or managed by the transaction management system 110. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The transaction management system 110 may also include one or more I/O devices 220 that may comprise one or more interfaces for receiving signals or input from devices and providing signals or output to one or more devices that allow data to be received and/or transmitted by the transaction management system 110. For example, the transaction management system 110 may include interface components, which may provide interfaces to one or more input devices, such as one or more keyboards, mouse devices, touch screens, track pads, trackballs, scroll wheels, digital cameras, microphones, sensors, and the like, that enable the transaction management system 110 to perform aspects consistent with the disclosure.

In example embodiments of the disclosed technology, the transaction management system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the transaction management system 110 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the transaction management system 110 may include a greater or lesser number of components than those illustrated.

Figure 3:
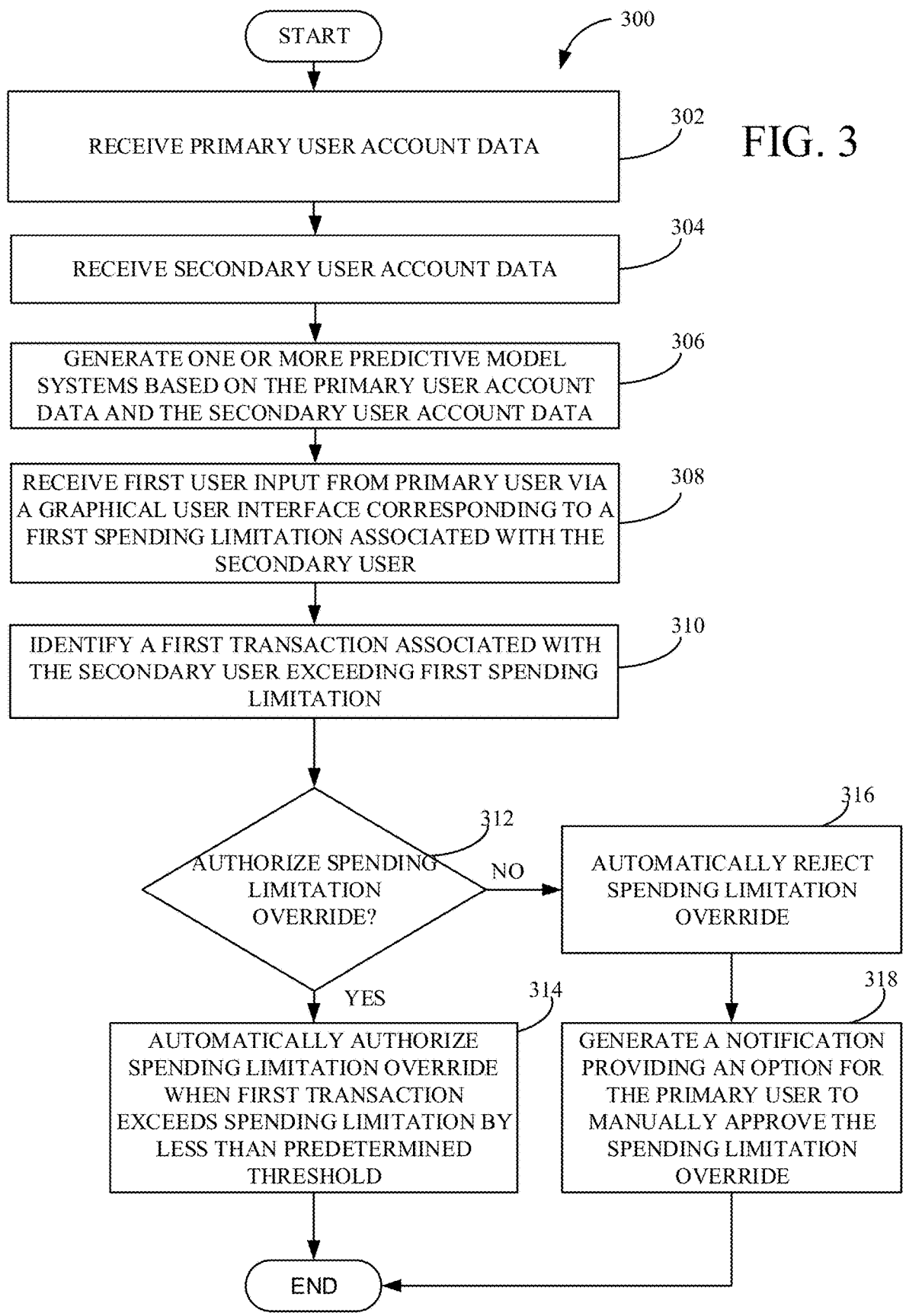
FIG. 3 is a flowchart of a method of automatically applying a spending limitation override for a purchase made by a secondary user of an account, according to an example embodiment.

FIG. 3 is a flowchart of a method of automatically applying a spending limitation override for a purchase made by a secondary user of an account, according to an example embodiment. Referring to FIG. 3, in block 302, the method may include receiving primary user account data. Primary user account data can include transaction data associated with the primary user account. The primary user account can be a credit account, such as, for example, a credit card account. The primary user account data can include an indication of merchant locations with which the primary user most commonly transacts. The primary user account data can also include an indication of account spending associated with the primary user. The primary user account data can also include historical data indicating how the primary user typically repays the credit associated with the primary user account data. The primary user account data can also include spending limits that the primary user has set for a secondary user associated with the primary user account. In some embodiments, the spending limits that the primary user sets may be geolocation specific, while in other embodiments the spending limits that the primary user sets may be merchant location specific. For example, the primary user may provide a geofenced area (e.g., based on a GPS location associated with the secondary user) in which the spending limitation is active. For merchant location specific spending limitations, the system may determine whether the secondary user is at a particular merchant location by comparing a GPS location associated with a secondary user device to a GPS location associated with the merchant in question. If the GPS location of the secondary user (e.g., a secondary user device used by the user) and the merchant match within a predetermined threshold of similarity, the spending limitation set by the primary user for the secondary user at that merchant location may be activated.

In block 304, the method may include receiving secondary user account data. Secondary user account data can include an indication of merchant locations with which the secondary user most commonly transacts. The secondary user account data can also include an indication of account spending associated with the secondary user. The secondary user account data can also include spending limitations that are associated with the secondary user. For example, as described above, the spending limits that the primary user sets may be geolocation specific, while in other embodiments the spending limits that the primary user sets may be merchant location specific. For example, the primary user may use an application (e.g., program 250) installed on the customer device, which may include an API that provides a graphical user interface that allows the primary user to set spending limits for a secondary user of the account of the primary user.

In block 306, the method may include generating one or more predictive model systems based on the primary user account data and the secondary user account data. For example, the transaction management system 110 may implement one or more predictive models by feeding the primary user account data and the secondary user account data into a machine learning model to produce a primary user predictive model and a secondary user predictive model. According to some embodiments, the primary user predictive model and the secondary user predictive model may be used by the transaction management system 110 to determine whether to automatically authorize a spending limit override. According to some embodiments, one or more of the primary user predictive model and the secondary user predictive model may be used to identify a recurring transaction and automatically fund the recurring transaction. The one or more predictive models may determine whether to allow a spending limit override based on one or more factors. For example, the system may determine that the transaction exceeds the set spending limit by less than a predetermined threshold and accordingly grant a spending limitation override. When the spending limitation is a geographical spending limitation (e.g., allowing the secondary user to make purchase only in a certain geographical area), the system may grant a spending limitation override if the secondary user's transaction location is within a predetermined geographical proximity to the geographical area associated with the spending limitation, even if the secondary user's transaction occurs outside of the geographical area set by the primary user as the secondary users spending limitation. In some embodiments, the spending limitation may be merchant specific (e.g., only allowing the secondary user to make purchases from certain merchants, such as a university cafeteria, or a university bookstore). However, the one or more predictive model systems may grant a spending limitation override for a transaction even when the secondary user attempts to transact with a merchant not specifically allowed for the secondary user. For example, if the secondary user has a spending limitation that only allows the secondary user to transact with the university cafeteria, the one or more predictive model systems may grant a spending limitation override when the secondary user attempts to make a purchase at the same university's bookstore, based on determining that the university cafeteria and the university bookstore share a sufficient degree of merchant similarity (e.g., by extracting a merchant identifier for the first transaction and the second transaction and determining that the merchant identifiers exceed a predetermined degree of similarity).

In block 308, the system may receive a first user input from the primary user. The first user input may be received via a graphical user interface, for example a graphical user interface provided by an API to customer device 130 associated with the primary user. Accordingly, transaction management system 110 may generate the graphical user interface and provide the graphical user interface to the customer device 130. The first user input from the primary user may be associated with a spending limitation for the secondary user of the account.

According to some embodiments, the spending limitation may be a merchant specific limitation. For example, the primary user may establish a spending limitation that is only active to a particular merchant, or a particular merchant location. For example, the spending limitation may be a $10 spending monthly spending limitation for Starbucks. In response, the secondary user may only spend up to $10 per month at any given Starbucks location. In some embodiments, the spending limitation may be location specific. For example, the $10 per month limitation may apply to a particular Starbucks location, such as Starbucks located on 123 Main Street in New York City. According to some embodiments, the spending limitation may not be merchant specific, but may be geographically specified. For example, the spending limitations may include a $100/month spending limitation for any transaction occurring in New York City. According to some embodiments, the spending limitations can be a "whitelist," meaning that transactions are allowed only if they are explicitly listed as allowed within the transaction management system 110. In some embodiments, the spending limitations can be a "blacklist," meaning that transactions are allowed unless they are explicitly listed as limited within the transaction management system 110.

According to some embodiments, the spending limitation may be temporary, such that after a predetermined time the spending limitation is automatically removed from the secondary account. For example, the spending limitation may be specific to a particular billing cycle associated with the credit account. In some embodiments, the spending limitation may be exclusive, such that the secondary user can only transact in the amounts allowed by the spending limitation, in the geographic areas associated with the spending limitation, at the merchants associated with the spending limitation, etc. In some embodiments, the spending limitation may be inclusive, such that the secondary user has spending limitations in certain geographic areas, merchants, and/or geographic locations, but outside of those limitations, the secondary user is free to transact with any merchant with transactions that are not otherwise limited by the spending limitation. In some embodiments, the spending limitation may be to limit the secondary user to transactions that are online-only, or brick-and-mortar only. According to some embodiments, the spending limitation may be a combination of any of the above-described spending limitations.

In block 310, the system (e.g., transaction management system 110) may identify a first transaction associated the secondary user that exceeds the first spending limitation. For example, the system (e.g., transaction management system 110) may continuously or intermittently receive updated transaction data from a merchant system 120 (e.g., merchant system 120A, merchant system 120B, merchant system 120C, etc.) with which the secondary user is transacting with. In some embodiments, the transaction management system 110 may instead receive the transaction data from a financial service provider, for example financial service provider system 140. After receiving the transaction data from a merchant system 120 or from the financial service provider system 140, the transaction management system 110 may determine whether the received transaction would exceed the spending limitation associated with the secondary user. For example, the system may identify that the transaction amount of a transaction attempted by the secondary user exceeds the spending limitation set by the primary user of the credit account. In some embodiments, the system may detect that the secondary user has exceeded the spending limitation because the secondary user has attempted a transaction outside of a geographic location to which the secondary user is limited to.

In decision block 312, the system may determine, using the one or more predictive model systems, whether to authorize a spending limitation override. For example, the transaction management system 110 may use the one or more predictive model systems to determine whether the first transaction is similar to transactions for which the primary user has manually provided spending limitation overrides in the past. In some embodiments, the one or more predictive model systems may determine to authorize a spending limitation override if the transaction amount exceeds the spending limitation by less than a predetermined threshold. For example, if the transaction amount of the first transaction is for $160, but the spending limitation for the secondary user is for $150, the system may authorize the spending limitation override because the excess of the first transaction is less than 10% over the spending limitation. According to some embodiments, the predetermined threshold by which the spending limitation may be exceeded may be dynamically determined by the one or more predictive model systems depending on the total transaction amount, preferences of the primary account holder, the geographic area of the transaction, etc.

When the system determines to authorize the spending limitation override, the method may move to block 314. When the system determines to not authorize the spending limitation override, the method may move to block 316. In block 314, the system may automatically authorize the spending limitation override when the first transaction exceeds the spending limitation by less than the predetermined threshold. In block 316, the system may automatically reject the spending limitation override. In block 318, the system may generate notification providing an option for the primary user to manually approve the spending limitation override. For example, the notification may be provided to customer device 130. Customer device 130 may display a graphical user interface for the primary user to interact with, that gives the option to the primary user to manually approve the spending limitation override in real-time.

Figure 4:
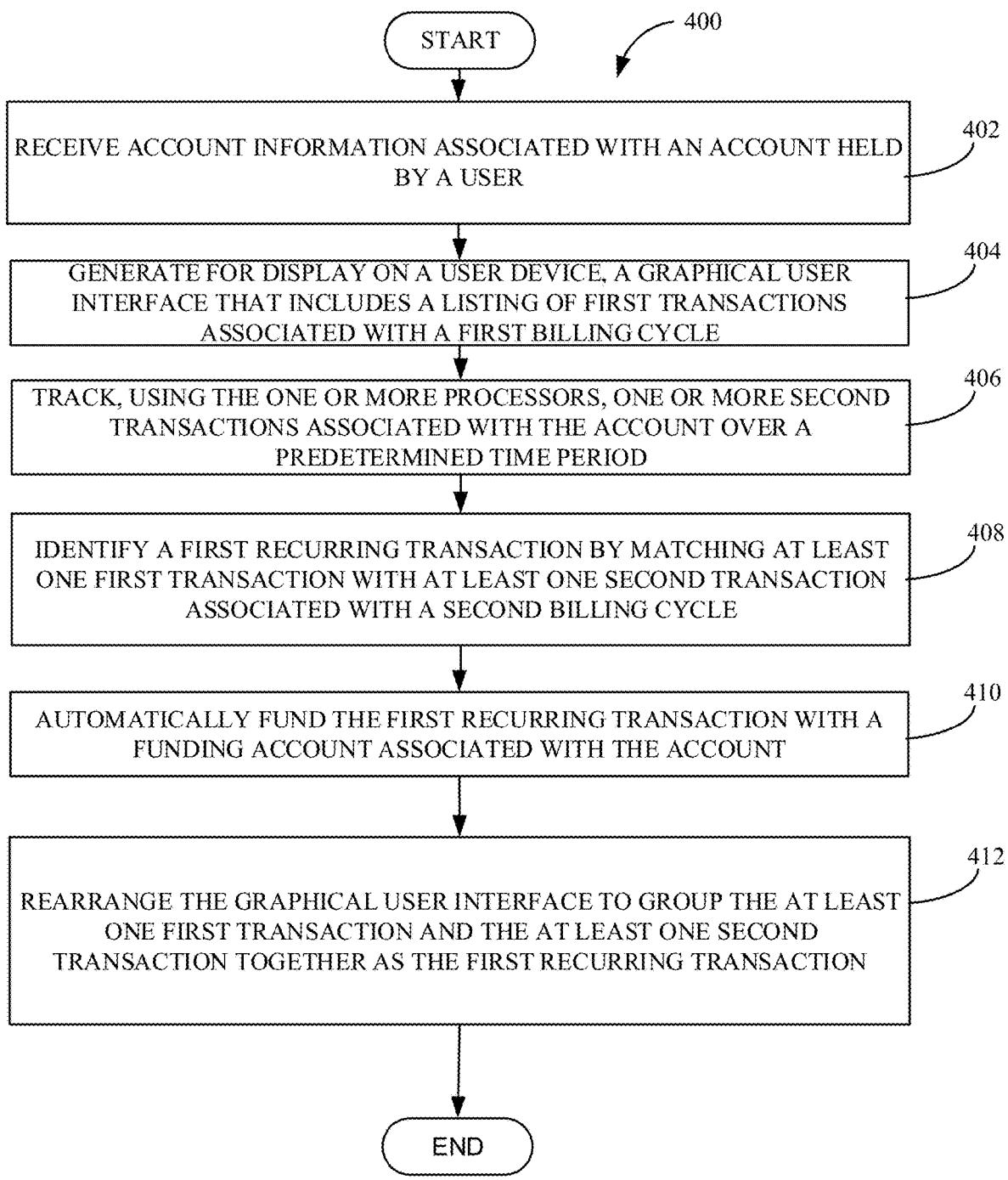
FIG. 4 is a flowchart of a method of identifying and automatically funding a recurring transaction, according to an example embodiment.

FIG. 4 is a flowchart of a method of identifying and automatically funding a recurring transaction, according to an example embodiment. In block 402, the system may receive account information associated with an account held by a user. According to some embodiments, the account may be a credit account, and the user may be a primary user of the credit account.

In block 404, the system (e.g., transaction management system 110) may generate, for display on a user device, a graphical user interface that includes a listing of first transactions. The first transactions may be associated with a first billing cycle of the account. In block 406, the system may track, using one or more processors (e.g., the one or more processors of transaction management system 110), one or more second transactions associated with the account over a predetermined time period. According to some embodiments, the one or more second transactions may be associated with a second billing cycle of the account.

In block 408, the system (e.g., transaction management system 110) may identify a first recurring transaction by matching at least one first transaction with at least one second transaction. According to some embodiments, the transaction management system 110 may use the one or more predictive model systems to correlate the at least one first transaction with the at least one second transaction. For example, the system may determine that the first transaction is associated with a first merchant, and that the second transaction is associated with the same merchant. The system may also determine that the transaction amount of the first transaction and the transaction amount of the second transaction is either the same or similar (e.g., plus or minus 10% of the total transaction amount). Based on determining that the merchant is the same between the first transaction and the second transaction and that the transaction amounts are the same or within a predetermined threshold of similarity, the system may determine that the at least one first transaction and the at least one second transaction are collectively associated with a recurring transaction. Examples of recurring transactions can include a phone bill, a cable bill, a utility bill, a home rental bill, an internet bill, a streaming subscription bill, a childcare bill, etc.

In block 410, the system (e.g., transaction management system 110) may automatically fund the first recurring transaction with a funding account associated with the account. For example, the funding account may be a checking or savings account that is associated with financial service provider system 140. Accordingly, transaction management system 110 may transmit instructions to financial service provider system 140 to automatically fund the recurring transaction using the funding account associated with the account.

In block 412, the system (e.g., transaction management system 110) may transmit instructions to user device 130 to rearrange the graphical user interface to group the at least one first transaction and the at least one second transaction together as the first recurring transaction. The graphical user interface may additionally include an indication that the first recurring transaction has been automatically funded by the funding account. According to some embodiments, the transaction management system 110 may automatically fund the first recurring transaction based in part on the one or more predictive model systems determining that the first recurring transaction exceeds a predetermined threshold of similarity to one or more second recurring transactions that were previously funded. In some embodiments, the automatic funding may include a full payment of the first recurring transaction, while in other embodiments, the automatic funding may include only a partial payment of the first recurring transaction. In some embodiments, the system may automatically issue a full payment of the first recurring transaction when the transaction management system 110 determines that the funding account has sufficient funds to fund the entire transaction amount of the first recurring transaction. According to some embodiments, the system may fund the first recurring transaction with a partial payment in response to determining that the funding account does not have sufficient funds to fund the entire transaction amount of the first recurring transaction. In the case that the system issues only a partial payment from the funding account, the system may determine an optimal repayment schedule based on available funds within the funding account and the total amount of the first recurring transaction in order to minimize the total amount of interest owed on the account, and/or a total amount of late payment fees owed on the account. After block 412, the method may end.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use case describe examples of a use of systems and methods for setting spending limits for secondary credit account users. These example use cases are intended solely for explanatory purposes and not for limitation. In one case, a primary user may wish to set a spending limit for a secondary user, who may be, for example, his child. The primary account holder may log into an application on his customer device, which may display a graphical user interface that allows the primary user to set spending limitations associated with the secondary account user. For example, the parent may set a maximum daily spend limitation for the secondary user of $100. The child may wish to purchase a college textbook for $110. When the child attempts to pay for the college textbook with the credit account, the system may identify that the transaction exceeds the spending limit. However, the one or more predictive model systems may determine that the excess is below a predetermined threshold and may automatically issue an account spending override, thereby allowing the transaction to be instantly authorized. In another example, the child may wish to buy a college textbook, but the price may be $150. In this situation, the transaction may be automatically rejected because the transaction exceeds the spending limitation by more than the predetermined threshold (e.g., 10%). However, in this case, the primary account holder may receive a notification, in real time, on the user device which indicates the transaction of the secondary user was denied. The primary account user may wish to authorize the transaction. Accordingly, the primary account user may provide an input to the customer device associated with a manual spending limitation override. The manual spending limitation override may allow the secondary user to complete the transaction. Similarly, a customer device associated with the secondary user may provide a notification to the secondary use that a manual spending limitation override has been authorized for the transaction, which allows the secondary user to attempt the transaction again, knowing it will now be authorized. Additionally, the manual override provided by the primary account user will be used by the system to update the one or more predictive model systems so that in the future, such a transaction may be automatically authorized by the transaction management system.

Examples of the present disclosure can be implemented according to at least the following clauses:

Clause 1: A system for setting spending limits for secondary credit account users, the system comprising: one or more processors; and memory in communication with the one or more processors and storing instructions that, when executed by the one or more processors, are configured to cause the system to: receive primary user account data associated with a credit account held by a primary user;

receive secondary user account data associated with a secondary user associated with the credit account; generate one or more predictive model systems based on the primary user account data and the secondary user account data; receive a first user input from the primary user via a graphical user interface, the first user input corresponding to a first spending limitation associated with the secondary user; identify a first transaction associated with the secondary user that exceeds the first spending limitation; determine, using the one or more predictive model systems, whether to authorize a spending limitation override; automatically authorize the spending limitation override when the first transaction exceeds the spending limitation by less than a predetermined threshold; when the first transaction exceeds the spending limitation by the predetermined threshold or greater than the predetermined threshold: automatically reject the spending limitation override; and generate, via the graphical user interface, a notification associated with the rejected spending limitation override, the notification providing an option for the primary user to manually approve the spending limitation override.

Clause 2: The system of clause 1, wherein the first spending limitation comprises a merchant specific spending limitation.

Clause 3: The system of clause 1, wherein the first spending limitation comprises a range of dates during which the first spending limitation is active for the secondary user.

Clause 4: The system of clause 1, wherein the first spending limitation comprises one or more geographic locations in which the first spending limitation is active for the secondary user.

Clause 5: The system of clause 1, wherein the first spending limitation is specific to a respective billing cycle associated with the credit account.

Clause 6: The system of clause 1, wherein the one or more predictive model systems comprise a primary user predictive model and a secondary user predictive model.

Clause 7: The system of clause 6, wherein the one or more predictive model systems are based on one or more predictive variables.

Clause 8: The system of clause 7, wherein the primary user predictive model is based on one or more predictive variables selected from primary merchant locations with which the primary user transacts, account spending associated with the primary user, a repayment schedule associated with the credit account, or combinations thereof.

Clause 9: The system of clause 7, wherein the secondary user predictive model is based on one or more predictive variables selected from secondary merchant locations with which the secondary user transacts, account spending associated with the secondary user, spending limitations associated with the secondary user, or combinations thereof.

Clause 10: The system of clause 1, wherein the memory includes instructions, that when executed by the one or more processors, are configured to cause the system to update the one or more predictive model systems based on the rejected or the authorized spending limitation override.

Clause 11: A system for detecting and automatically funding recurring purchases, the system comprising: one or more processors; and memory in communication with the one or more processors and storing instructions that, when executed by the one or more processors, are configured to cause the system to: receive account information associated with an account held by a user; generate, for display on a user device, a graphical user interface that comprises a listing of first transactions associated with a first billing cycle; track, using the one or more processors, one or more second transactions associated with the account over a predetermined time period; identify a first recurring transaction by matching at least one first transaction with at least one second transaction associated with a second billing cycle; automatically fund the first recurring transaction with a funding account associated with the account; and rearrange the graphical user interface to group the at least one first transaction and the at least one second transaction together as the first recurring transaction.

Clause 12: The system of clause 11, wherein the memory includes instructions, that when executed by the one or more processors, are configured to cause the system to: generate a predictive model system based on the received account information; wherein automatically funding the recurring transaction comprises determining, with the predictive model system, that the first recurring transaction exceeds a predetermined threshold of similarity to one or more second recurring transactions that were previously funded.

Clause 13: The system of clause 12, wherein funding the first recurring transaction further comprises: receiving funding account information associated with the funding account; automatically issuing a first payment comprising an entire transaction amount associated with the first recurring transaction in response to determining that the funding account has sufficient funds to fund the entire transaction amount; and automatically issuing a second payment comprising less than the entire transaction amount in response to determining that the funding account has insufficient funds to fund the entire transaction amount.

Clause 14: The system of clause 13, wherein issuing the second payment is scheduled to minimize a fee selected from a late payment fee, an interest fee, or combinations thereof.

Clause 15: The system of clause 12, wherein the one or more second recurring transactions comprise transactions that were automatically funded based on the predictive model system.

Clause 16: A system for setting spending limits for secondary credit account users, the system comprising: one or more processors; and memory in communication with the one or more processors and storing instructions that, when executed by the one or more processors, are configured to cause the system to: receive primary user account data associated with a credit account held by a primary user; receive secondary user account data associated with a secondary user associated with the credit account; generate a primary user predictive model based on the primary user account data, the primary user predictive model based on one or more predictive variables selected from primary merchant locations with which the primary user transacts, account spending associated with the primary user, a repayment schedule associated with the credit account, or combinations thereof; generate a secondary user predictive model based on the secondary user account data, the secondary user predictive model based on one or more predictive variables selected from secondary merchant locations with which the secondary user transacts, account spending associated with the secondary user, spending limitations associated with the secondary user, or combinations thereof; receive a first user input from the primary user via a graphical user interface, the first user input corresponding to a first spending limitation associated with the secondary user; identify a first transaction associated with the secondary user that exceeds the first spending limitation; determine, using the primary user predictive model and the secondary user predictive model, whether to authorize a spending limitation override; automatically authorize the spending limitation override when the first transaction exceeds the spending limitation by less than a predetermined threshold; when the first transaction exceeds the spending limitation by the predetermined threshold or greater than the predetermined threshold: automatically reject the spending limitation override; and generate, via the graphical user interface, a notification associated with the rejected spending limitation override, the notification providing an option for the primary user to manually approve the spending limitation override.

Clause 17: The system of clause 16, wherein the memory includes instructions, that when executed by the one or more processors, are configured to cause the system to update at least one of primary user predictive model and the secondary user predictive model based on the rejected or the authorized spending limitation override.

Clause 18: The system of clause 16, wherein the first spending limitation comprises a merchant specific spending limitation.

Clause 19: The system of clause 16, wherein the first spending limitation comprises a range of dates during which the first spending limitation is active for the secondary user.

Clause 20: The system of clause 16, wherein the first spending comprises one or more geographic locations in which the first spending limitation is active for the secondary user.

What is claimed is:

1. A system for setting spending limits for secondary credit account users, the system comprising:
   one or more processors; and
   memory in communication with the one or more processors and storing instructions that, when executed by the one or more processors, are configured to cause the system to:
      receive primary user account data associated with a credit account held by a primary user;
      receive secondary user account data associated with a secondary user associated with the credit account;
      generate one or more predictive model systems based on the primary user account data and the secondary user account data, wherein the one or more predictive model systems comprise one or more machine learning models that are trained using data associated with past transactions and associated indications of whether the primary user did or did not manually execute a spending limitation override for each past transaction;
      receive a first user input from the primary user via a graphical user interface, the first user input corresponding to a spending limitation associated with the secondary user;
      identify a transaction associated with the secondary user that exceeds the spending limitation;
      dynamically determine, using the one or more predictive model systems, a threshold;
      automatically authorize a spending limitation override when the transaction exceeds the spending limitation by less than the threshold;
      when the transaction exceeds the spending limitation by the threshold or greater than the threshold:
         automatically reject the spending limitation override;
         generate, via the graphical user interface, a notification associated with the rejected spending limitation override, the notification providing an option for the primary user to manually approve the spending limitation override;
      receive a second user input from the primary user via the graphical user interface, the second user input comprising a manual override instruction, wherein the manual override instruction comprises an indication of whether or not to manually approve the spending limitation override; and
      update the one or more predictive model systems based on the received manual override instruction.

2. The system of claim 1, wherein the spending limitation comprises a merchant specific spending limitation.

3. The system of claim 1, wherein the spending limitation comprises a range of dates during which the spending limitation is active for the secondary user.

4. The system of claim 1, wherein the spending limitation comprises one or more geographic locations in which the spending limitation is active for the secondary user.

5. The system of claim 1, wherein the spending limitation is specific to a respective billing cycle associated with the credit account.

6. The system of claim 1, wherein the one or more predictive model systems comprise a primary user predictive model and a secondary user predictive model.

7. The system of claim 6, wherein the one or more predictive model systems are based on one or more predictive variables.

8. The system of claim 7, wherein the primary user predictive model is based on one or more predictive variables selected from primary merchant locations with which the primary user transacts, account spending associated with the primary user, a repayment schedule associated with the credit account, or combinations thereof.

9. The system of claim 7, wherein the secondary user predictive model is based on one or more predictive variables selected from secondary merchant locations with which the secondary user transacts, account spending associated with the secondary user, spending limitations associated with the secondary user, or combinations thereof.

10. The system of claim 1, wherein the memory includes instructions, that when executed by the one or more processors, are configured to cause the system to update the one or more predictive model systems based on the rejected or the authorized spending limitation override.

11. A system for setting spending limits for secondary credit account users, the system comprising:
    one or more processors; and
    memory in communication with the one or more processors and storing instructions that, when executed by the one or more processors, are configured to cause the system to:
       receive primary user account data associated with a credit account held by a primary user;
       receive secondary user account data associated with a secondary user associated with the credit account;
       generate a primary user predictive model based on the primary user account data, the primary user predictive model based on one or more predictive variables selected from primary merchant locations with which the primary user transacts, account spending associated with the primary user, a repayment schedule associated with the credit account, or combinations thereof;
       generate a secondary user predictive model based on the secondary user account data, the secondary user predictive model based on one or more predictive variables selected from secondary merchant locations with which the secondary user transacts, account spending associated with the secondary user, spending limitations associated with the secondary user, or combinations thereof;

receive a first user input from the primary user via a graphical user interface, the first user input corresponding to a spending limitation associated with the secondary user;

identify a transaction associated with the secondary user that exceeds the spending limitation;

dynamically determine, using the primary user predictive model and the secondary user predictive model, a threshold, wherein the primary user predictive model and the secondary user predictive model comprise machine learning models that are trained using data associated with past transactions and associated indications of whether the primary user did or did not manually execute a spending limitation override for each past transaction;

automatically authorize a spending limitation override when the transaction exceeds the spending limitation by less than the threshold;

when the transaction exceeds the spending limitation by the threshold or greater than the threshold:
automatically reject the spending limitation override;
generate, via the graphical user interface, a notification associated with the rejected spending limitation override, the notification providing an option for the primary user to manually approve the spending limitation override;

receive a second user input from the primary user via the graphical user interface, the second user input comprising a manual override instruction, wherein the manual override instruction comprises an indication of whether or not to manually approve the spending limitation override; and update the primary user predictive model and the secondary user predictive model based on the received manual override instruction.

12. The system of claim 11, wherein the memory includes instructions, that when executed by the one or more processors, are configured to cause the system to update at least one of the primary user predictive model and the secondary user predictive model based on the rejected or the authorized spending limitation override.

13. The system of claim 11, wherein the spending limitation comprises a merchant specific spending limitation.

14. The system of claim 11, wherein the spending limitation comprises a range of dates during which the spending limitation is active for the secondary user.

15. The system of claim 11, wherein the spending limitation comprises one or more geographic locations in which the spending limitation is active for the secondary user.

* * * * *

UNITED STATES PATENT AND TRADEMARK OFFICE
CERTIFICATE OF CORRECTION

| | | |
|---|---|---|
| PATENT NO. | : 11,935,067 B2 | Page 1 of 1 |
| APPLICATION NO. | : 17/539010 | |
| DATED | : March 19, 2024 | |
| INVENTOR(S) | : Joshy | |

It is certified that error appears in the above-identified patent and that said Letters Patent is hereby corrected as shown below:

On the Title Page

Item (12), should read: Joshy.

Item (72), Please correct, Joshy Rendheer to Rendheer Joshy.

Signed and Sealed this
Twentieth Day of August, 2024

*Katherine Kelly Vidal*
Katherine Kelly Vidal
*Director of the United States Patent and Trademark Office*